Figure 3:
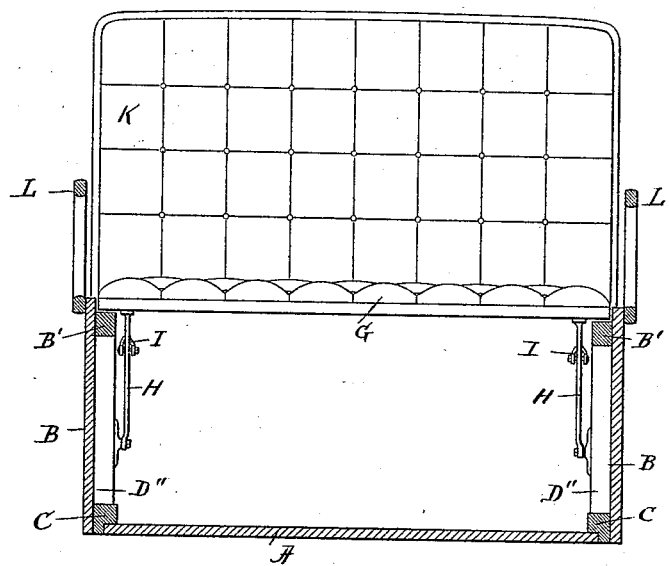

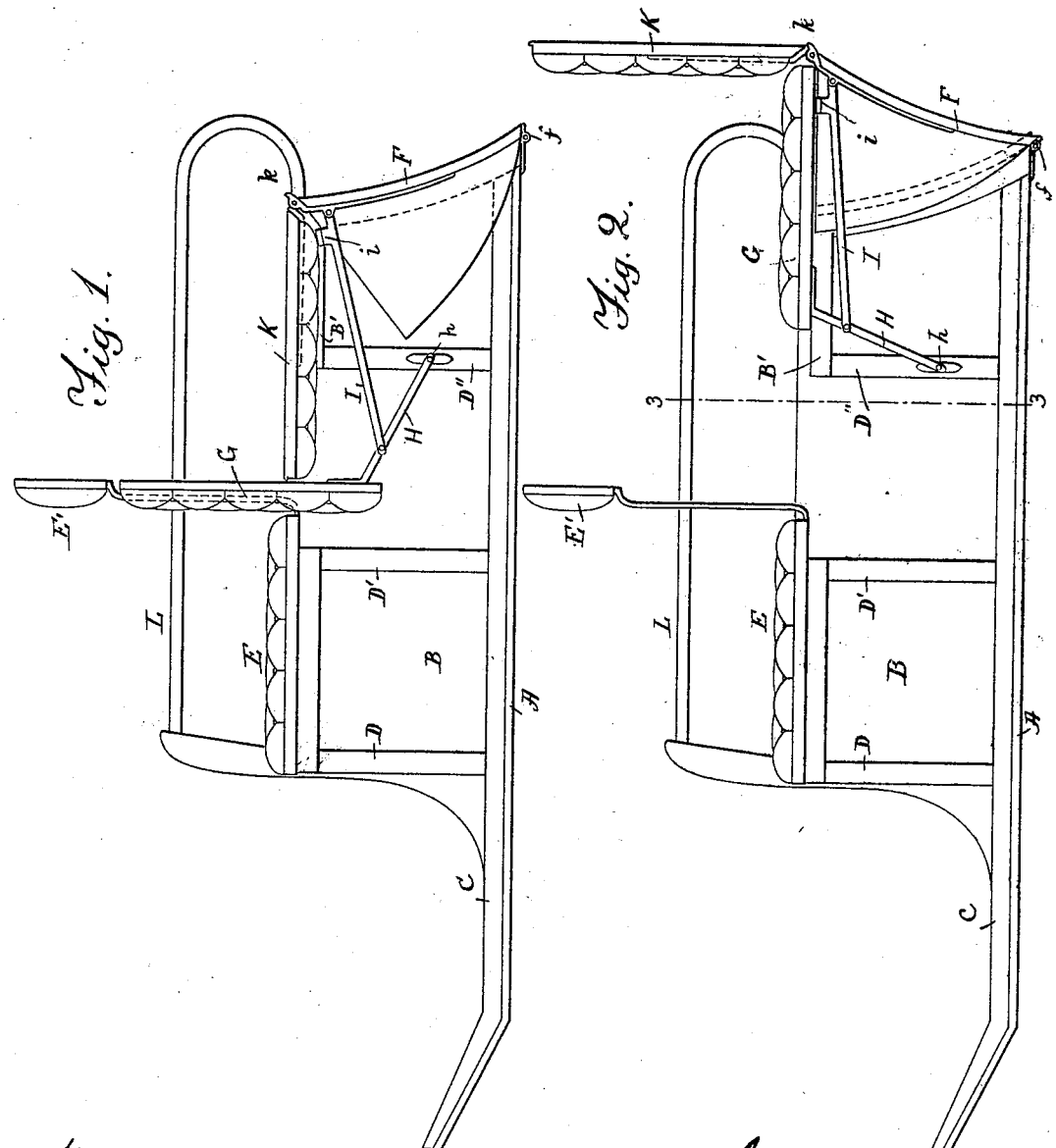

(No Model.)  2 Sheets—Sheet 2.

J. MILLER, Jr.
JUMP SEAT FOR CARRIAGES.

No. 512,618. Patented Jan. 9, 1894.

Witnesses
Alice A. Perkins
Avrin F. Hill

Inventor
John Miller Jr.
by H. Van Andrew, his atty

UNITED STATES PATENT OFFICE.

JOHN MILLER, JR., OF AMESBURY, MASSACHUSETTS, ASSIGNOR TO MILLER BROTHERS, OF SAME PLACE.

JUMP-SEAT FOR CARRIAGES.

SPECIFICATION forming part of Letters Patent No. 512,618, dated January 9, 1894.

Application filed May 24, 1893. Serial No. 475,318. (No model.)

*To all whom it may concern:*

Be it known that I, JOHN MILLER, Jr., a citizen of the United States, and a resident of Amesbury, in the county of Essex and State of Massachusetts, have invented new and useful Improvements in Jump-Seats for Carriages, of which the following, taken in connection with the accompanying drawings, is a specification.

This invention relates to improvements in combination single and double seat carriages of the kind having a front seat and a movable rear seat and it is carried out as follows, reference being had to the accompanying drawings, wherein—

Figure 1 represents a side elevation of my invention, showing it in use as a single seated carriage, the side or panel being removed to better illustrate the construction and arrangement of the invention. Fig. 2 represents a similar view showing the invention in use as a double seated carriage; and Fig. 3 represents a cross-section on the line 3—3, shown in Fig. 2.

Similar letters refer to similar parts wherever they occur on the different parts of the drawings.

In the drawings A represents the bottom board of a carriage body as usual having the sides or side panels B, B, and sills C, C.

D, D', D'', represent the posts or frames of the sides of the carriage as usual.

E represents the front seat with its lazy-back E' in the ordinary manner; said front seat being divided as is common in carriages of this kind to permit entrance to the rear seat as usual.

F is the tail-board pivoted at *f* to the lower rear end of the carriage as is usual in vehicles of this kind.

G is the rear seat to the under side of which is firmly secured at or near its forward end, a pair of metal arms H, H, which are pivoted in their lower ends at *h, h,* to the posts D'', D'', or sides of the carriage as shown, said arms H, H, being pivotally connected to the tail-board F by means of links I, I.

B', B', are sills at the interior of the rear portion of the carriage sides which serve as supports for the forward end of the rear seat G when the latter is in use as a seat as shown in Figs. 2 and 3, and they also serve as supports for the rear seat back K when the latter is swung out of position as shown in Fig. 1; the said rear seat back K is hinged at *k* by means of a suitable stop hinge to the upper edge of the tail-board F as shown in Figs. 1 and 2. Each link I has at or near its rear end an offset or projection *i* which serves as a rear support for the rear end of the seat G when used as a seat as shown in Fig. 2; such projections being preferably covered with rubber or other elastic or cushioned material so as not to deface or injure the wood work of said seat when supported thereon.

When the device is in use as a double seated carriage as shown in Fig. 2 and it is desired to convert it into a single seated carriage it is only necessary to swing the tail board F forward against the rear end of the carriage body when the rear seat G will be automatically swung to the vertical position back of the front seat E and below its lazy-back E' as shown in Fig. 1 in which position it will serve as a back for said front seat E, thus utilizing it for such purpose when not in use as a rear seat. The back K of the rear seat is then turned down to the position shown in Fig. 1 and serves in this position as an inclosing deck for the rear portion of the carriage.

L, L, are the side rails of the carriage as usual.

Having thus fully described the nature, construction, and operation of my invention, I wish to secure by Letters Patent and claim—

1. In a carriage, a rear jump seat, having arms rigidly attached to its forward under side, said arms being pivotally connected at their free ends to the frame of the carriage, combined with a pivoted tail-board, a back for said jump seat hinged to the tail board and links pivotally connecting said tail-board, and arms, substantially as described.

2. In a carriage a rear jump seat having arms or rods H pivoted to the frame or sides combined with a pivoted tail board and links I pivoted to said arms H and tail board, and having projections *i* adapted to serve as rests for said seat when open, substantially as and for the purpose set forth.

3. The combination with a carriage having a front seat, and pivoted tail-board, of a rear jump-seat pivotally connected to the frame of the carriage, links connecting said rear seat and tail board, for the purpose of automatically moving the rear seat into position as a back for the front seat by the closing of said tail-board, and a back for the rear seat hinged to the tail-board, and adapted to form an inclosing panel for the rear part of the carriage, substantially as described.

In testimony whereof I have signed my name to this specification, in the presence of two subscribing witnesses, on this 22d day of May, A. D. 1893.

JOHN MILLER, JR.

Witnesses:
GEORGE H. BRIGGS,
DELL W. DOLBIER.